US010864419B2

(12) United States Patent
Villar et al.

(10) Patent No.: US 10,864,419 B2
(45) Date of Patent: *Dec. 15, 2020

(54) HOCKEY-STICK BLADE WITH TAILORED PERFORMANCE REGIONS

(71) Applicant: Bauer Hockey Ltd., Blainville (CA)

(72) Inventors: Edsel Padilla Villar, Woodland Hills, CA (US); Michael Lloyd Snow, Chula Vista, CA (US); Michael Mountain, Northridge, CA (US)

(73) Assignee: Bauer Hockey, LLC, Exeter, NH (US)

(*) Notice: Subject to any disclaimer, the term of this patent is extended or adjusted under 35 U.S.C. 154(b) by 0 days.

This patent is subject to a terminal disclaimer.

(21) Appl. No.: 16/504,767

(22) Filed: Jul. 8, 2019

(65) Prior Publication Data

US 2019/0329110 A1 Oct. 31, 2019

Related U.S. Application Data

(63) Continuation of application No. 15/869,412, filed on Jan. 12, 2018, now Pat. No. 10,350,470, which is a continuation of application No. 14/720,639, filed on May 22, 2015, now Pat. No. 9,868,038, which is a continuation of application No. 13/688,061, filed on Nov. 28, 2012, now Pat. No. 9,039,549.

(51) Int. Cl.
*A63B 59/70* (2015.01)
*A63B 102/24* (2015.01)
*A63B 102/22* (2015.01)
*B29L 31/52* (2006.01)

(52) U.S. Cl.
CPC .......... *A63B 59/70* (2015.10); *A63B 2102/22* (2015.10); *A63B 2102/24* (2015.10); *A63B 2209/02* (2013.01); *B29L 2031/52* (2013.01)

(58) Field of Classification Search
CPC .. A63B 59/70; A63B 2102/24; A63B 2102/22
USPC ................................................. 473/560–563
See application file for complete search history.

(56) References Cited

U.S. PATENT DOCUMENTS 2,774,596 A 12/1956 Bredenberg
4,076,240 A 2/1978 Haddad
(Continued)

FOREIGN PATENT DOCUMENTS

CA 2037273 A1 8/1992
CA 1315816 C 4/1993
CA 2523964 A1 4/2006

OTHER PUBLICATIONS

"20K Sickick Accublade", Reebok (2012), captured Sep. 17, 2013.
(Continued)

*Primary Examiner* — Laura Davison
(74) *Attorney, Agent, or Firm* — Banner & Witcoff, Ltd.

(57) ABSTRACT

A hockey-stick blade includes a heel region, a toe region spaced longitudinally from the heel region, and a mid-region located between the heel region and the toe region. The toe region includes one or more reinforcing elements, optionally of different lengths, located at different vertical positions within the toe region. The blade further includes a hosel that optionally is tailored to substantially match the strength and stiffness characteristics of an attached or integral hockey stick shaft. The mid-region of the blade exhibits improved feel and flexibility characteristics due to the increased stiffness in the toe region.

9 Claims, 2 Drawing Sheets

(56) References Cited

U.S. PATENT DOCUMENTS

| | | | |
|---|---|---|---|
| 4,084,818 | A | 4/1978 | Goupil et al. |
| 5,050,878 | A | 9/1991 | Deleris |
| 5,407,195 | A | 4/1995 | Tiitola et al. |
| 6,019,691 | A | 2/2000 | Hilborn |
| 7,008,338 | B2 | 3/2006 | Pearson |
| 7,097,577 | B2 | 8/2006 | Goldsmith et al. |
| 7,144,343 | B2 | 12/2006 | Goldsmith et al. |
| 7,261,787 | B2 | 8/2007 | Bellefleur et al. |
| 7,294,072 | B2 | 11/2007 | Montecchia |
| 7,438,655 | B2 | 10/2008 | Garcia |
| 7,476,167 | B2 | 1/2009 | Garcia |
| 8,608,597 | B2 | 12/2013 | Avnery et al. |
| 8,677,599 | B2 | 3/2014 | Gans |
| 9,039,549 | B2 | 5/2015 | Villar et al. |
| 9,044,658 | B2 * | 6/2015 | Xun .................. B29C 70/865 |
| 9,248,356 | B2 | 2/2016 | Pearson et al. |
| 9,868,038 | B2 | 1/2018 | Villar et al. |
| 10,350,470 | B2 * | 7/2019 | Villar .................. A63B 59/70 |
| 2003/0004019 | A1 | 1/2003 | Lussier et al. |
| 2009/0005198 | A1 | 1/2009 | Shiu |
| 2009/0054180 | A1 | 2/2009 | Garcia |
| 2011/0237365 | A1 | 9/2011 | McGrath et al. |
| 2012/0142460 | A1 | 6/2012 | Mollner et al. |
| 2013/0116070 | A1 | 5/2013 | Xun et al. |
| 2014/0057746 | A1 | 2/2014 | Jeanneau |
| 2015/0045154 | A1 | 2/2015 | Pearson et al. |

OTHER PUBLICATIONS

"20K Sickick 4™ Stick," Reebok CCM Hockey Products, Product Catalogue 2013, p. 17.
Aug. 6, 2019—(CA) Examination Report—App 2,892,616.
Oct. 16, 2019—(CA) Office Action—App. No. 2,892,616.
Apr. 14, 2014—(PCT) International Search Report and Written Opinion—App 2013071510.

\* cited by examiner

HOCKEY-STICK BLADE WITH TAILORED PERFORMANCE REGIONS

CROSS REFERENCE TO RELATED APPLICATIONS

This application is a continuation of U.S. patent application Ser. No. 15/869,412, filed Jan. 12, 2018, which is a continuation of U.S. patent application Ser. No. 14/720,639, filed May 22, 2015, now U.S. Pat. No. 9,868,038, which is a continuation of U.S. patent application Ser. No. 13/688,061, filed Nov. 28, 2012 and now U.S. Pat. No. 9,039,549, both of which are incorporated fully herein by reference.

BACKGROUND

Composite hockey-stick blades typically are constructed by wrapping fiber-reinforced plies over one or more elements to create a hockey-stick blade preform. The blade pre-form is then placed within an external mold where resin, which is either pre-impregnated in the fiber plies or added via a resin-transfer process, is cured. An expansion bladder within the blade pre-form, or one or more heat-expanding core elements, may be used to provide internal pressure to mold the blade into the shape of the external mold. The curing process hardens the resin so that the fibers become disposed within a hardened resin matrix, while the mold defines the exterior shape of the cured blade (which sometimes is integrally molded with a hockey-stick shaft).

The fibers in composite hockey-stick blades typically are oriented uniformly throughout the blade, which generally has a substantially uniform thickness. Some blades include separate elements that increase the weight in the heel region or other portions of the blade to provide varied feel and control. The toe region of these blades, however, has been ignored with respect to modifying weight and feel. Further, while isolated regions in some composite blades have been modified, the blades are not tailored throughout their lengths to provide tuned performance and feel throughout the lengths of the blades.

SUMMARY

A hockey-stick blade includes a heel region, a toe region spaced longitudinally from the heel region, and a mid-region located between the heel region and the toe region. The toe region includes one or more reinforcing elements, optionally of different lengths, located at different vertical positions within the toe region. The blade further includes a hosel that optionally is tailored to substantially match the strength and stiffness characteristics of an attached or integral hockey stick shaft. The mid-region of the blade exhibits improved feel and flexibility characteristics due to the increased stiffness in the toe region. Other features and advantages will appear hereinafter. The features described above can be used separately or together, or in various combinations of one or more of them.

BRIEF DESCRIPTION OF THE DRAWINGS

In the drawings, wherein the same reference number indicates the same element throughout the various views.

DETAILED DESCRIPTION OF THE DRAWINGS

Various embodiments of the invention will now be described. The following description provides specific details for a thorough understanding and enabling description of these embodiments. One skilled in the art will understand, however, that the invention may be practiced without many of these details. Additionally, some well-known structures or functions may not be shown or described in detail so as to avoid unnecessarily obscuring the relevant description of the various embodiments.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this detailed description section.

Where the context permits, singular or plural terms may also include the plural or singular term, respectively. Moreover, unless the word "or" is expressly limited to mean only a single item exclusive from the other items in a list of two or more items, then the use of "or" in such a list is to be interpreted as including (a) any single item in the list, (b) all of the items in the list, or (c) any combination of items in the list.

Figure 1:
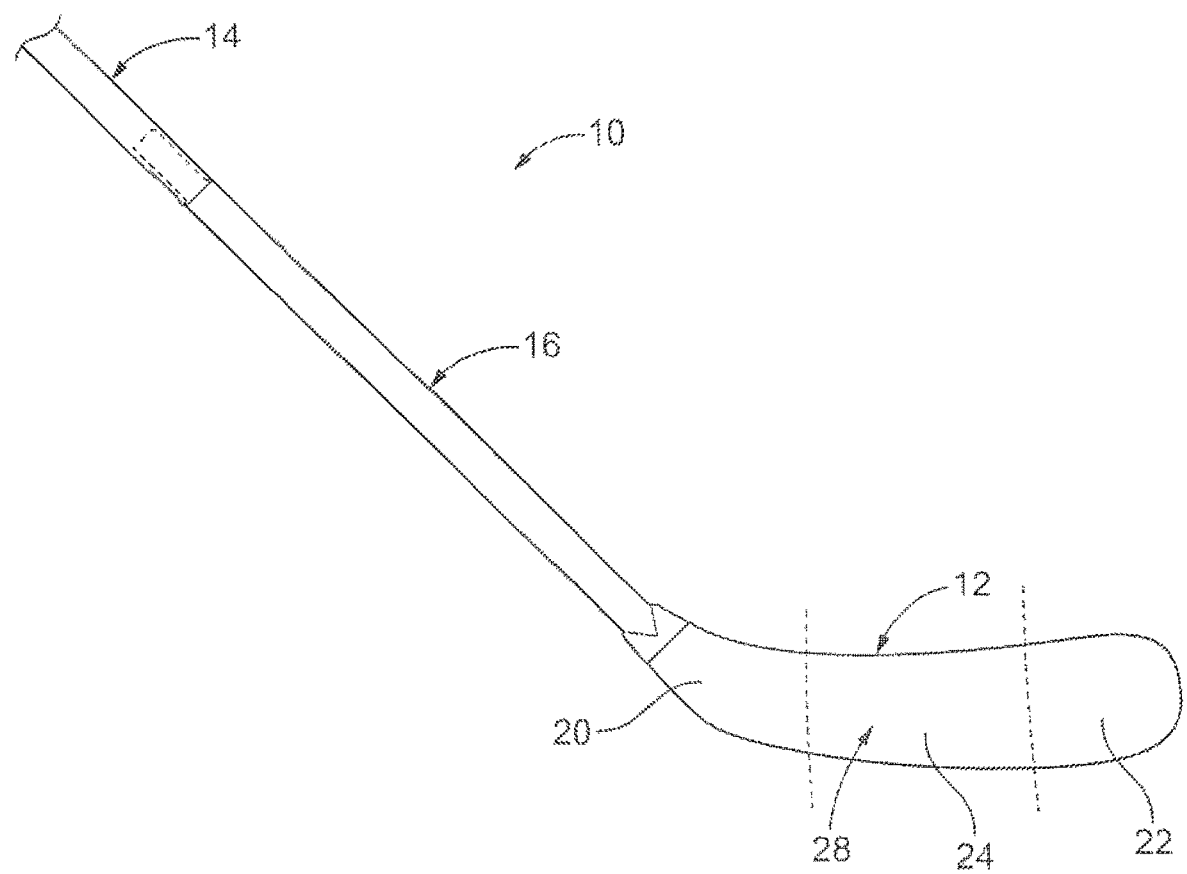
FIG. 1 is a perspective view of a hockey stick according to one embodiment.
Figure 2:
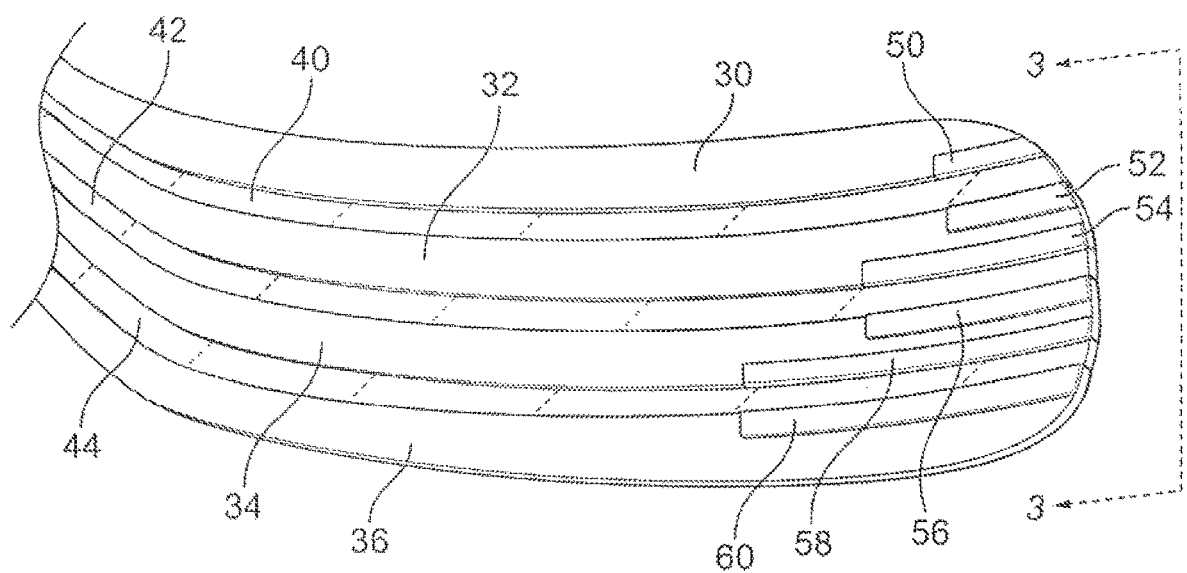
FIG. 2 is a partial-perspective view of a hockey-stick blade with the external plies omitted to highlight internal features of the blade.
Figure 3:
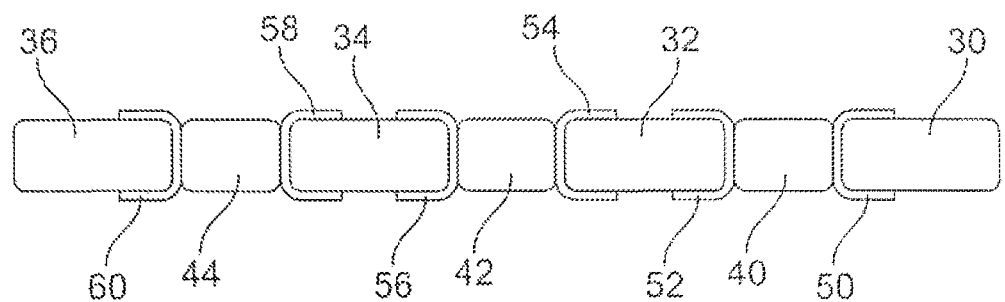
FIG. 3 is a sectional view of Section 3-3 of FIG. 2.

Turning now in detail to the drawings, as shown in FIGS. 1-3, a hockey stick 10 includes a blade 12 and a shaft 14. The blade 12 may be detachable from the shaft 14 at its upper end, or it may be permanently or integrally attached to the shaft 14. The joint between the blade 12 and the shaft 14 may be formed by a hosel 16 or tenon at the upper-end of the blade 12 that is received within a socket in the lower end of the shaft 14. Any other suitable connections between the blade 12 and the shaft 14, including those disclosed in U.S. Pat. Nos. 7,097,577 and 7,144,343, for example, which are incorporated herein by reference, may be used. The blade 12 and shaft 14 may be constructed in any suitable manner, using any suitable materials, such as by those methods and materials described in incorporated U.S. Pat. Nos. 7,097,577 and 7,144,343, while further incorporating one or more of the additional features described herein.

The blade 12 generally includes the upwardly extending hosel 16 and three regions arranged in a longitudinal direction along the length of the blade: a heel region 20, a toe region 22, and a mid-region 24 located between the heel region 20 and the toe region 22. As described in detail below, each of these regions may be tailored to provide enhanced performance and feel characteristics throughout the blade.

The blade 12 includes a front face (not visible in the figures) and a rear face 28 separated in a lateral direction by a cavity. The cavity is filled with one or more core elements made of foam, elastomeric materials, or one or more other suitable materials, such as those described in incorporated U.S. Pat. Nos. 7,097,577 and 7,144,343. The core elements are wrapped in one or more fiber reinforced plies, such as plies reinforced with carbon, aramid, boron, glass, or other suitable materials, such as those described in incorporated U.S. Pat. Nos. 7,097,577 and 7,144,343.

As shown in FIG. 2, in the illustrated embodiment, the interior of the blade 12 includes four core elements 30, 32, 34, 36 generally running from the toe region 22 to the heel region 20 of the blade 12. The core elements optionally are separated from one another by three structural ribs 40, 42, 44 that also generally run from the toe to the heel of the blade 12. The ribs 40, 42, 44, which provide stiffness and structural support to the blade 12, optionally are made of fiber-reinforced materials that are integral with, adhered to, or otherwise affixed to the front face and the rear face 28 of the blade. Any other suitable number of core elements and ribs may alternatively be used. In other embodiments, a single core element may be used, such that no ribs are included. In still other embodiments, multiple core elements may be used without the inclusion of ribs, such that the core elements abut one another or are spaced apart from one another.

In one embodiment, four core elements 30, 32, 34, 36 are each wrapped in a first ply including carbon fibers oriented at approximately 30° relative to the lateral direction between the front and rear blade faces, and a second ply including carbon fibers oriented at approximately −30° relative to this lateral direction. The two plies optionally may be combined into a single "sandwich ply," in which the first ply is ironed to—or otherwise attached to or merged with-the second ply. A greater or lesser number of plies may be wrapped around each of the core elements 30, 32, 34, 36, depending on the thickness of the core elements, the thickness of the plies, or the stiffness and flexibility goals of a given blade design.

The hosel 16 optionally extends a significant distance from the heel region 20-and may even have a greater length than that of the blade 12 from the toe region 22 to the heel region 20—as shown in FIG. 1. Further, the hosel 16 preferably includes fibers oriented to approximate the stiffness and strength characteristics of the shaft 14, such that the hosel 16 essentially is a structural extension of the shaft 14. In one embodiment, the hosel 16 includes at least one first ply including fibers oriented at approximately 90° relative to the lateral direction, and at least one neighboring second ply including fibers oriented at approximately 0° relative to the lateral direction, which allows the hosel 16 to "blend in" with most composite hockey-stick shafts, which typically have similar fiber orientations. This blending creates a low "kick point" in the stick 10, which is desirable to many players. As with the plies wrapped around the core elements 30, 32, 34, 36, the plies in the hosel 16 optionally may be combined into one or more sandwich plies.

In one embodiment, the toe region 22 includes one or more reinforcing elements that enhance torque control and blade-tip "preloading" when striking a puck, ball, or other object (collectively referred to herein, for ease of description, as a "puck"). In this manner, the reinforcing elements reduce "lag" of the toe region 22, particularly during a "wrist shot." The reinforcing elements may include fiber reinforced plies, similar to those used to wrap the core elements 30, 32, 34, 36, or may include other materials that stiffen the blade 12 in the toe region 22. For example, each reinforcing element may be a sandwich ply including "fibers oriented at 30° and −30°, or at 45° and −45°, relative to the lateral direction, or including fibers oriented at any other suitable angles.

These reinforcing plies may be positioned on, adhered to, or wrapped around the plies that are wrapped around the core elements 30, 32, 34, 36. In an alternative embodiment, the reinforcing elements may be directly positioned on, adhered to, or wrapped around the core elements 30, 32, 34, 36 before the plies extending from the toe region 22 to the heel region 20 are wrapped around the core elements, such that the reinforcing elements are contained within these plies. Thus, the reinforcing elements may be indirectly or directly positioned on, adhered to, or wrapped around the core elements.

In the illustrated embodiment, a first reinforcing element 50 is wrapped around the lower edge of the upper core element 30. A second reinforcing element 52 is wrapped around the upper edge of the next core element 32, while a third reinforcing element 54 is wrapped around the lower edge of that core element 32. A fourth reinforcing element 56 is wrapped around the upper edge of the next core element 34, while a fifth reinforcing element 58 is wrapped around the lower edge of that core element 34. Finally, a sixth reinforcing element 60 is wrapped around the upper edge of the lower core element 36.

A greater or lesser number of reinforcing elements may alternatively be included. For example, the two upper reinforcing elements 50, 52 may be omitted, such that four reinforcing elements 54, 56, 58, 60 are used. Further, the number of core elements could be varied such that a greater or lesser number of core-element surfaces, onto which reinforcing elements could be applied, would be exposed. Also, reinforcing elements could be omitted from certain vertical positions to provide varied feel and performance.

In the illustrated embodiment, the first and second reinforcing elements 50, 52 have substantially the same first length; the third and fourth reinforcing elements 54, 56 have substantially the same second length, which is longer than the first length; and the fifth and sixth reinforcing elements 58, 60 have substantially the same third length, which is longer than the second length. Arranging the reinforcing elements in this manner provides increasing stiffness in the toe region 22 as the lower edge of the blade 12 is approached, which generally provides better performance and allows for better puck control. Each of the reinforcing elements alternatively could have substantially the same length, or their lengths could increase as the upper edge of the blade is approached. The individual reinforcing elements may be wrapped only around the lower or upper region of a given core element, or they may be wrapped around an entire core element. In another embodiment, the reinforcing elements may additionally or alternatively be located on the ribs between the core elements.

In one embodiment, the first length of reinforcing elements 50, 52 is approximately 1.0 inch, while the second length of reinforcing elements 54, 56 is approximately 2.5 inches, and the third length of reinforcing elements 58, 60 is approximately 4.0 inches. These reinforcing-element lengths have been found to produce desirable performance and control in the toe region 22, and also to provide better feel and control in the mid-region 24, due to the increased stiffness in the toe region 22 which results in a feeling of increased flexibility in the mid-region 24. Any other suitable reinforcing-element lengths may be used, however, to meet the desired performance and feel characteristics of a given player.

The fiber-angles in any of the blade regions described above may be varied based on desired performance and feel characteristics. For example, on the core elements 30, 32, 34, 36, a first ply including carbon fibers oriented at approximately 45° relative to the lateral direction may be used in combination with a second ply including carbon fibers oriented at approximately −45°, 0°, or 90° relative to the lateral direction. Similar fiber angles could be used in the plies of the reinforcing elements, as well. Any other suitable combination of fiber angles may alternatively be used.

Figure 4:
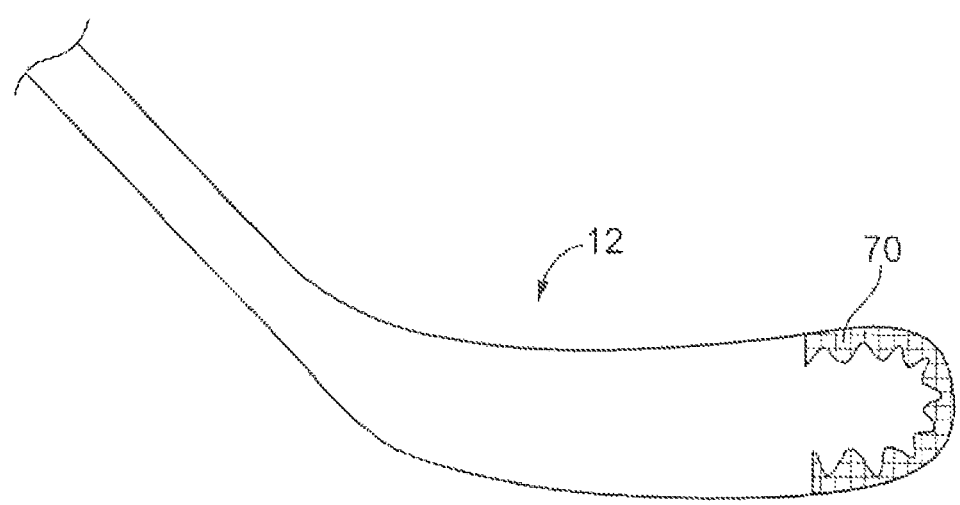
FIG. 4 is a partial-perspective view of a hockey-stick blade with the face plies omitted to illustrate a serrated reinforcing ply in the toe region of the blade.

Once the core elements are wrapped in fiber-reinforced plies, and then reinforcing elements are positioned in the toe region 22, one or more face plies may be wrapped around or otherwise applied to the front and rear surfaces of the wrapped core elements to form a blade pre-form structure. The blade pre-form structure may include additional layers of material, such as one or more glass reinforced, serrated plies 70 positioned around the toe region 22 to increase durability (as shown in FIG. 4), one or more layers of scrim cloth to reinforce the various plies, and any other suitable materials. Once the blade pre-form structure is completed, the blade may be cured using a bladder-molding process, a compression-molding process, or in any other suitable manner, such as by those methods described, for example, in incorporated U.S. Pat. Nos. 7,097,577 and 7,144,343.

The hockey-stick blade 12 described herein provides several advantages. For example, by tailoring the hosel 16 to approximate the stiffness and strength of the shaft 14, the hosel 16 essentially becomes an extension of the shaft and allows for a lower "kick point," which is preferred by many players. By selectively stiffening portions of the toe region 22, pre-loading and torque control of the toe region 22 are enhanced, and lag is reduced, resulting in greater velocity and accuracy when shooting a puck, particularly during "wrist shots." Further, by stiffening the toe region, the mid-region, by comparison, exhibits a more flexible feel, allowing for better control of the puck on hard passes and shots.

Any of the above-described embodiments may be used alone or in combination with one another. Further, the hockey stick or hockey-stick blade may include additional features not described herein. While several embodiments have been shown and described, various ct1anges and substitutions may of course be made, without departing from the spirit and scope of the invention. The invention, therefore, should not be limited, except by the following claims and their equivalents.

What is claimed is:

1. A hockey-stick blade including a front face, and a rear face spaced from the front face in a lateral direction, comprising:
   a heel region;
   a toe region spaced from the heel region in a longitudinal direction;
   a mid-region located between the heel region and the toe region;
   a plurality of core elements including at least an upper core element and a lower core element and wherein a first reinforcing element is positioned on a lower surface of the upper core element, wherein a second reinforcing element is positioned on an upper surface of the lower core element; and
   means for selectively stiffening the toe region such that the toe region is longitudinally stiffened to a greater extent than the mid-region and the heel region.

2. The hockey-stick blade of claim 1 wherein the means for selectively stiffening the toe region comprises the first reinforcing element and the second reinforcing element.

3. The hockey-stick blade of claim 1, wherein the first and second reinforcing elements comprise fiber-reinforced plies.

4. The hockey-stick blade of claim 3, wherein the fiber-reinforced plies are disposed within a hardened resin matrix.

5. The hockey-stick blade of claim 4, further comprising a plurality of ribs positioned between each pair of vertically neighboring core elements running longitudinally from the toe region toward the heel region.

6. The hockey-stick blade of claim 1 wherein the plurality of core elements are spaced apart from one another in a vertical direction.

7. The hockey-stick blade of claim 6 wherein one reinforcing element has a length in the longitudinal direction that is greater than a length of another reinforcing element in the longitudinal direction.

8. The hockey-stick blade of claim 1 further comprising serrated plies positioned around the toe region.

9. The hockey-stick blade of claim 1, wherein the first reinforcing element is longer than the second reinforcing element.

* * * * *